(12) United States Patent
Jonsson et al.

(10) Patent No.: US 9,704,045 B2
(45) Date of Patent: Jul. 11, 2017

(54) USER CLASSIFICATION BASED UPON IMAGES

(71) Applicant: Yahoo!, Inc., Sunnyvale, CA (US)

(72) Inventors: Kristjan Jonsson, San Diego, CA (US); Sanjeev Jagannatha Rao, La Jolla, CA (US); Daniel J. Tasse, San Francisco, CA (US)

(73) Assignee: YAHOO! INC., Sunnyvale, CA (US)

( * ) Notice: Subject to any disclaimer, the term of this patent is extended or adjusted under 35 U.S.C. 154(b) by 94 days.

(21) Appl. No.: 14/875,943

(22) Filed: Oct. 6, 2015

(65) Prior Publication Data
US 2017/0098124 A1   Apr. 6, 2017

(51) Int. Cl.
   *G06K 9/00*   (2006.01)
   *G06K 9/60*   (2006.01)
   *G06K 9/62*   (2006.01)

(52) U.S. Cl.
   CPC ......... *G06K 9/00684* (2013.01); *G06K 9/628* (2013.01); *G06K 9/6212* (2013.01); *G06K 9/6287* (2013.01)

(58) Field of Classification Search
   None
   See application file for complete search history.

(56) References Cited

U.S. PATENT DOCUMENTS

| | | | |
|---|---|---|---|
| 9,058,611 B2* | 6/2015 | Saunders | G06Q 30/02 |
| 9,098,529 B1* | 8/2015 | Seth | G06F 17/30241 |
| 2010/0118025 A1* | 5/2010 | Smith | G06Q 30/02 345/418 |
| 2012/0144458 A1* | 6/2012 | Mechaley, Jr. | G06F 21/35 726/5 |
| 2012/0239506 A1* | 9/2012 | Saunders | G06Q 30/02 705/14.67 |
| 2014/0236932 A1* | 8/2014 | Ikonomov | G06F 17/30241 707/722 |
| 2015/0026019 A1* | 1/2015 | Lekas | G06Q 10/087 705/28 |

(Continued)

OTHER PUBLICATIONS

Shah, et al., "Community Detection in Networks: The Leader-Follower Algorithm", 2010, pp. 1-8, http://snap.stanford.edu/nipsgraphs2010/Home_files/16_zaman_NIPS10_workshop_v2.pdf.

(Continued)

Primary Examiner — Randolph I Chu
(74) Attorney, Agent, or Firm — Cooper Legal Group, LLC

(57) ABSTRACT

One or more systems and/or methods for providing content to a user are provided. An image, associated with a user, may be evaluated utilizing an image classifier to identify an object within the image. The object may be utilized to identify a predicted class for the user. In an example, the predicted class may correspond to a life event (e.g., graduating college, having a baby, buying a house, etc.) and/or a life stage (e.g., adolescence, retirement, etc.). Locational information (e.g., a geotag) for the image may be evaluated to determine an image location (e.g., a location where the image was generated). Responsive to the image location corresponding to a home location of the user, the predicted class may be determined to be a class associated with the user. Content (e.g., promotional content) may be selected from a content repository based upon the class and subsequently provided to the user.

20 Claims, 11 Drawing Sheets

(56) References Cited

U.S. PATENT DOCUMENTS

2015/0143209 A1* 5/2015 Sudai ................... G06F 17/248
    715/202
2015/0248710 A1* 9/2015 Medvedovsky ... G06Q 30/0271
    705/14.67
2015/0363640 A1* 12/2015 Meyer ................... G06Q 10/10
    382/224

OTHER PUBLICATIONS

Bo, et al., "Object Recognition with Hierarchical Kernel Descriptors", pp. 1729-1736, 2011, http://www.cs.washington.edu/robotics/postscripts/hkdes-cvpr-11.pdf.

* cited by examiner

USER CLASSIFICATION BASED UPON IMAGES

BACKGROUND

Users are often provided with content (e.g., digital images, videos, audio recordings, promotional content, etc.) while performing tasks (e.g., visiting a webpage, reading an article, etc.) on computing devices (e.g., personal computers, smartphones, tablets, etc.). For example, users may be provided with video clips while reading articles on a webpage. In another example, users may be provided with voiceover audio recordings while listening to music from a music streaming service. However, the content provided may not be relevant to many users. For example, a user who just graduated from high school may not be interested in content associated with dentures. Unfortunately, many computing devices and/or content providers may lack technology that can accurately identify relevant content items for a particular user. Thus, potentially irrelevant content may be provided to users.

SUMMARY

In accordance with the present disclosure, one or more systems and/or methods for providing content to a user are provided. An image, associated with a user, may be evaluated utilizing an image classifier to identify an object within the image. In an example, the image classifier may comprise a non-linear classifier utilizing a convolutional neural network configured to transform image elements into image features. In another example, the image classifier may be configured to transform image elements through a series of layers, wherein each layer extracts features from an output of a previous layer. A predicted class (e.g., an athletic class, a college class, a school class, a graduate class, an engagement class, a wedding class, a parent class, etc.) for the user may be identified based upon the image feature. Responsive to the image location corresponding to a home location of the user (e.g., the image depicts the user at a college attended by the user, as opposed to a transient location not associated with the user such as a vacation destination), determining that the predicted class is a class associated with the user. Content from a content repository may be identified based upon the class. The content may be provided to the user (e.g., through a content display area of a webpage, by a popup notification, etc.).

In an example, the home location (e.g., a location where the user lives, a location where an activity primarily takes place, a routinely visited location by the user, a work place of the user, a school of the user, a hometown or city of the user, etc.) for the user may be determined based upon one or more additional images associated with the user (e.g., images uploaded to a social networking website may be evaluated to determine the home location for the user). For example, an image repository associated with the user may be evaluated to identify a set of images comprising locational information. One or more images within the set of images may be grouped into a first cluster based upon the one or more images corresponding to a first location. In an example, the first location may comprise a surrounding area, such as a 20-mile radius surrounding specific GPS coordinates. A total number of images in the first cluster and/or a timespan for the images in the first cluster may be determined. Responsive to the total number of images in the first cluster exceeding an image count threshold and the timespan for the first cluster exceeding a timespan threshold, determining that the first location corresponds to the home location of the user. It may be appreciated that a variety of techniques may be used to identify the home location, such as historical GPS information indicating that the user frequently travels to a place of work, a social network profile indicating that the user attends a particular a college, etc.

In an example, a confidence score may be determined for the predicted class. The confidence score may correspond to a match score associated with the identification of the image feature and/or the object. The match score may be a function of a comparison of the features and/or objects within the image to a set of known features and/or known objects. In an example, responsive to the match score exceeding a threshold amount, increasing the confidence score for the predicted class.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. COMPUTING SCENARIO

The following provides a discussion of some types of computing scenarios in which the disclosed subject matter may be utilized and/or implemented.

1.1. Networking

Figure 1:
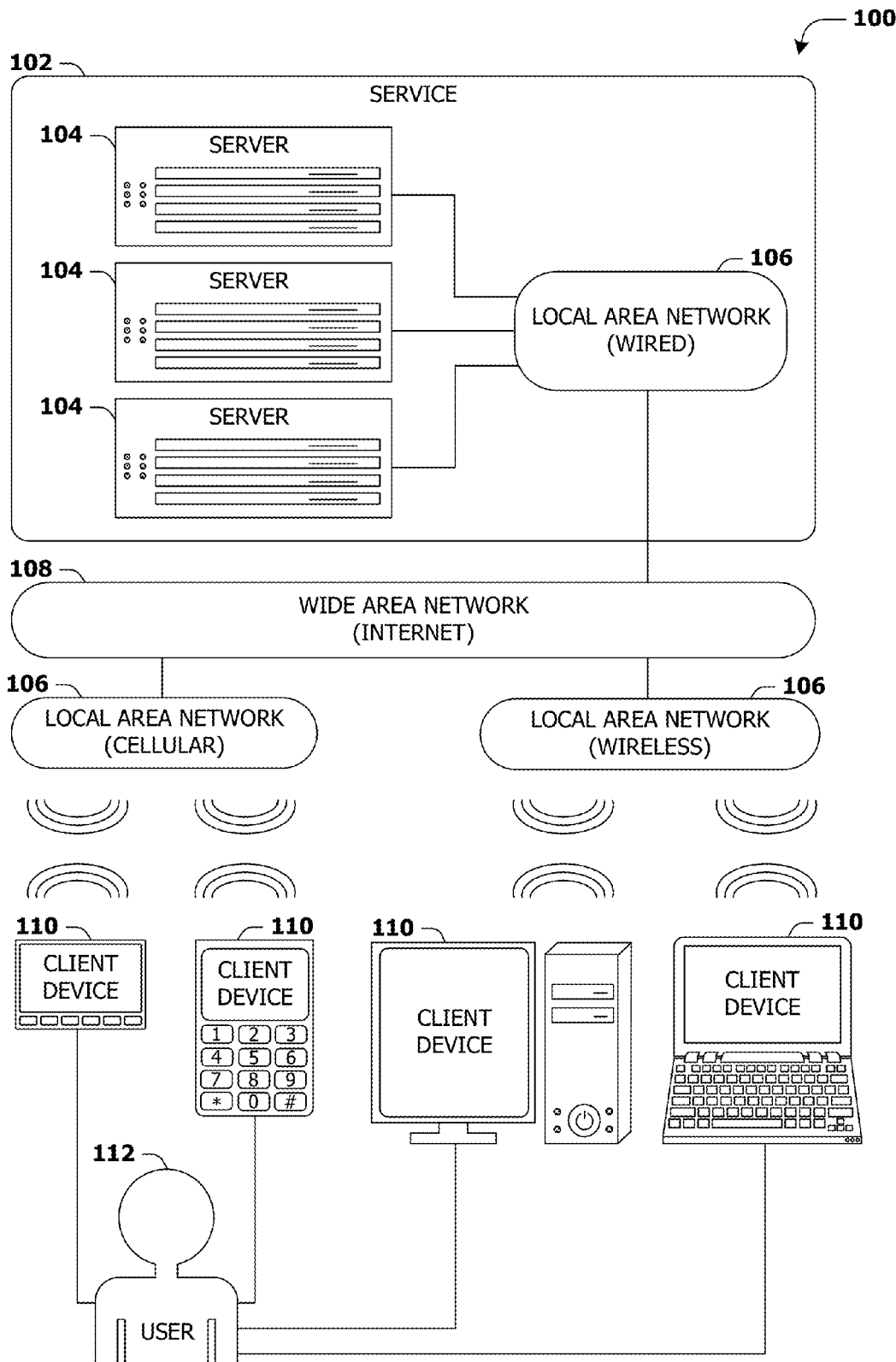
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
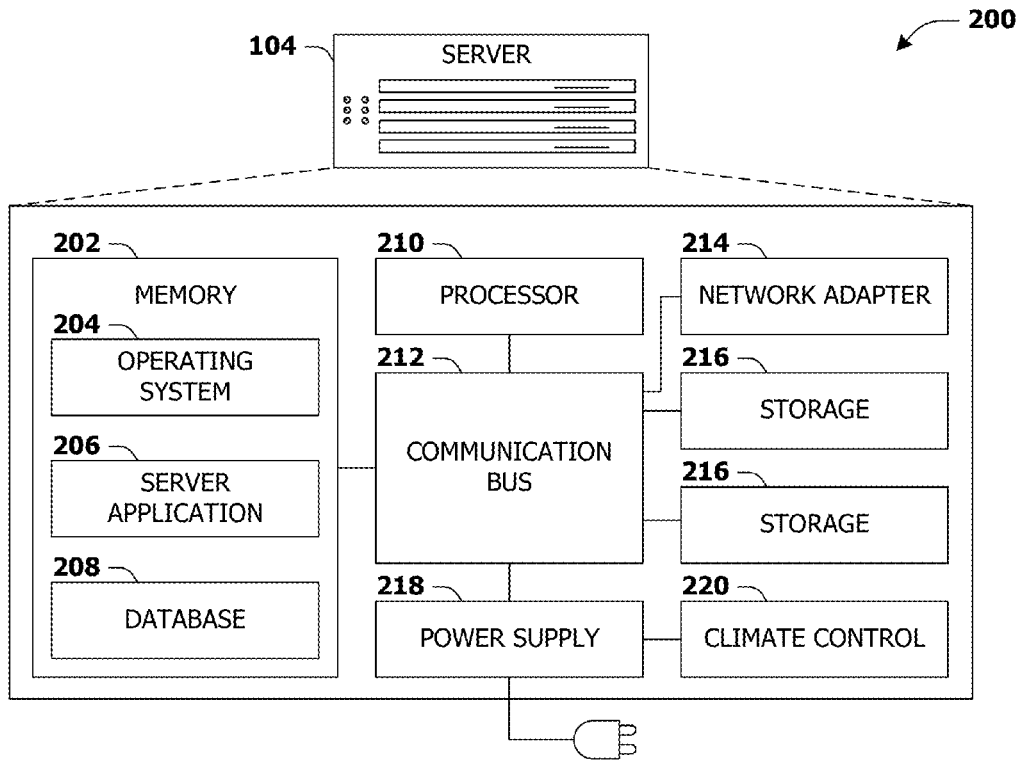
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
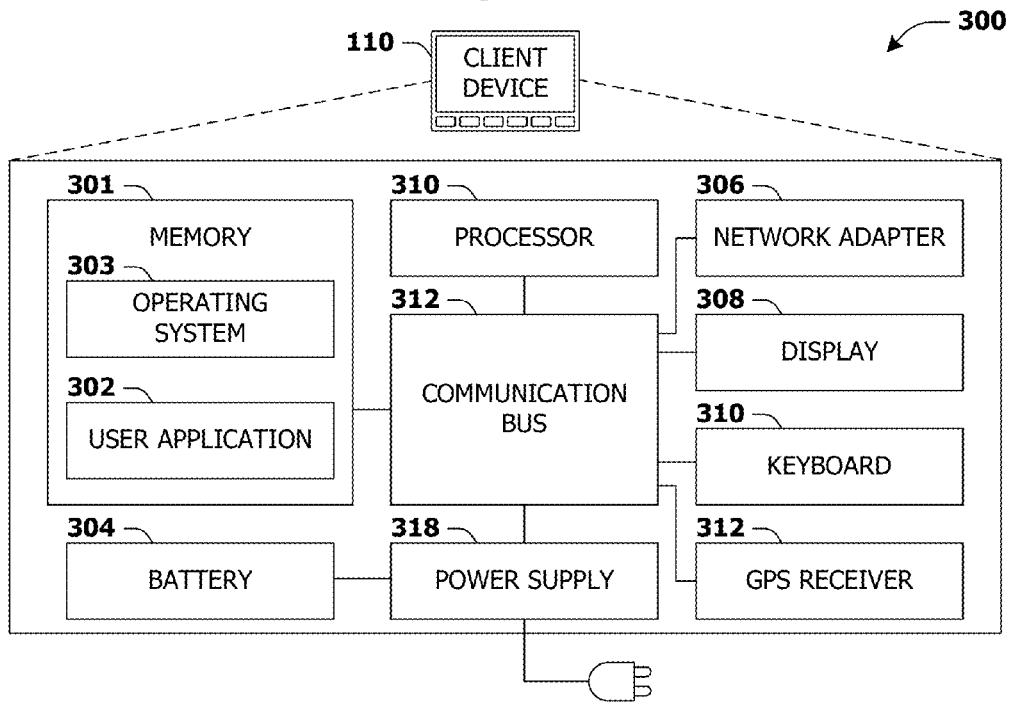
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. PRESENTED TECHNIQUES

One or more systems and/or techniques for providing content to a user are provided. Many image classifiers and/or image classifying techniques may lack an ability to accurately determine a class associated with a user from an image and/or provide relevant content to the user based upon the class associated with the user. As provided herein, an image, associated with a user, may be evaluated utilizing an image classifier to identify an object within the image. A predicted class may be identified based upon the object. In an example, the predicted class may correspond to a life event (e.g., graduating college, having a baby, buying a house, getting married, etc.), a life stage (e.g., adolescence, early adulthood, retirement, etc.), a career or interest of the user. The predicted class may be determined to be a class associated with the user based upon the image location (e.g., a location where the image was generated) corresponding to a home location of the user (e.g., a city, college, work place, or other location associated with the user, as opposed to a transient location of the user such as a vacation destination). Content, selected based upon the class associated with the user, may be provide to the user. In an example, the content may comprise promotional content for products and/or services.

Content may be identified and subsequently provided to a user based upon a class corresponding to a life stage and/or a life event associated with the user. In this way, the content provided to the user may be relevant to the user. Moreover, users may realize a need for a product and/or service associated with the content as a result of the product and/or service being associated with a current life event and/or a current life stage (e.g., a first time homebuyer may realize an interest in a lawnmower based upon a content item associated with the lawnmower being provided to the user). Thus, responsive to the content being associated with a life event and/or a life stage of the user, the user may be more likely to interact with the content (e.g., the user may click on a hyperlink displayed within the content item associated with the lawnmower in order to be redirected to a third party webpage to learn more about the lawnmower and/or purchase the lawnmower). Still further, by confirming a predicted class is in fact a class associated with the user, such as by confirming an image location corresponds to a home location for the user, the accuracy of identifying the class for the user may be improved. Accordingly, a user's experience with content provided to the user, as well as an operating efficiency and/or function of an image classifier, may be enhanced (e.g., the user may be provided with less irrelevant content; an image classifier may utilize less computing resource to identify relevant content items from a content repository by efficiently utilizing characteristics of the class to locate relevant content; the image classifier may utilize less computing resources and/or network resources by providing fewer content items to the user before relevant content items are provided; etc.).

Figure 4:
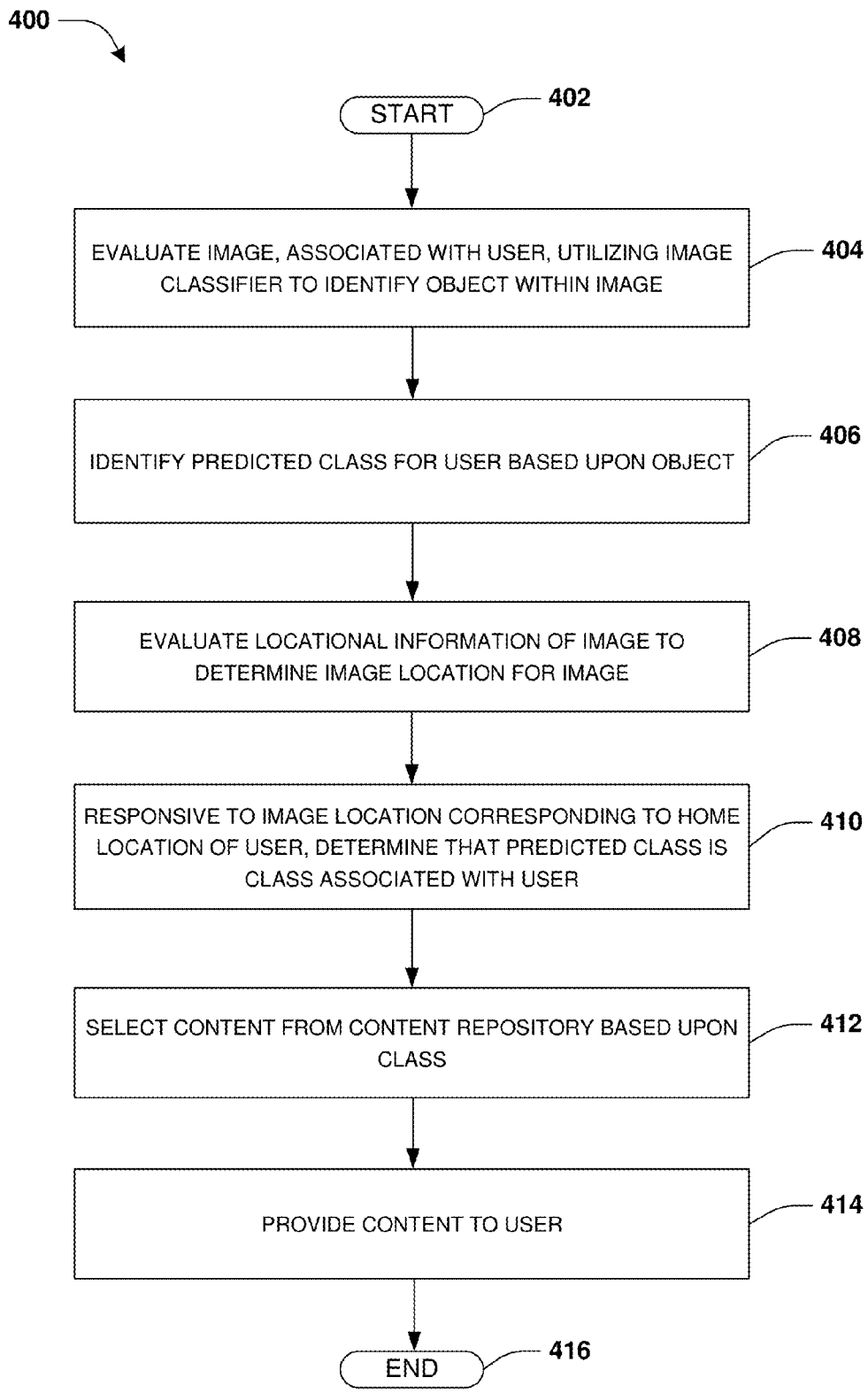
FIG. 4 is a flow chart illustrating an example method for providing content to a user.

An embodiment of providing content to a user is illustrated by an example method 400 of FIG. 4. At 402, the method 400 starts. At 404, an image, associated with a user, may be evaluated utilizing an image classifier to identify an object within the image. In an example, the image may be received in response to the user providing the image to at least one of a social media community, a microblogging community, a workgroup community, an online forum community, or an image sharing community (e.g., the image may be uploaded to an image sharing website, the image may be utilized in a post on a social networking website, the image may be uploaded through a microblogging mobile app, etc.). In an example, the user may take affirmative action, such as providing opt-in consent, to allow access to and/or use of user images (e.g., images from social network posts, microblogs, image sharing websites, etc.), such as for the purpose of determining a class for the user.

In an example, the image classifier (e.g., a support vector machine, a self-organizing map, an adaptive resonance theory, etc.) may utilize a neural network, such as a convolutional neural network. The image classifier may comprise a non-linear classifier configured to utilize a plurality of hidden layers. The neural network may be configured to transform image elements (e.g., pixels, etc.) through a series of layers, wherein each layer extracts features from an output of a previous layer. In an example, at least one of the layers may comprise a pooling layer, a rectified linear unit layer, a convolutional layer, or fully connected layer. The image classifier may evaluate image features to determine identities of objects (e.g., a person, a place, a thing, etc.) within the image. For example, the image classifier may be utilized to evaluate image data (e.g., pixel attributes) to identify image features, such as a curve, a degree of circularity (e.g., half circle, full circle, etc.), an edginess parameter (e.g., zig-zag vs sinusoid), a symmetry parameter (e.g., irregular, similar, mirror image symmetry, etc.), line (e.g., dashed, straight, curved, line thickness, etc.), coloring, structure (e.g., intensity of structure along a contour, etc.), and/or the like.

In an example, image features may be evaluated to identify one or more objects (e.g., a dog, a bridge, a person, a bat, an emblem, etc.), within the image. The evaluation of the image features may comprise matching the image features for the image to known features for known objects (e.g., a first layer may be configured to recognize basic image features, such as straight lines, corners, circular arcs, triangles, circles, etc., and a second layer may be configured to recognize complex shapes, such as eyes, mouths, noses, paws, logos, landmarks, etc.). By way of example, a car image may be inputted into the image classifier. The car image may be evaluated to identify primitive image features of the car image, such as oriented edges, colors, or the like. The primitive image features may be evaluated to identify object parts, such as wheels, doors, fenders, etc. The object parts may be evaluated to identify the object, such as a car.

At 406, a predicted class for the user may be identified based upon the object. In an example, a plurality of objects from within the image may be evaluated to determine the predicted class. For example, a classification repository may be assessed using objects from the image to identify the predicted class based upon the objects (e.g., a baseball bat object and a baseball glove object may be utilized to assess the classification repository to identify a baseball class). In an example, the predicted class may correspond to a class of users, a stage of life (e.g., adolescence), an activity (e.g., playing baseball), and/or a life event (e.g., responsive to identifying an individual in a cap and gown, a graduation life event may be identified for the user). The predicted class may comprise an athletic class (e.g., football players, baseball users, soccer users, etc.), a college class, a school class, a graduate class (e.g., a class of individuals that just graduated), an engagement class (e.g., a class of users that are engaged), a wedding class (e.g., a class of user that are newly married), a parent class (e.g., a class of user that have children, such as a first parent class that comprises users having a child between one week old and 1 year old, a second parent class comprising users having children between 1 year and 3 years old, etc.), a new home class, a career class, a hobby class (e.g., a remote control plane class), a pet owner class, or the like.

At 408, locational information from the image may be evaluated to determine an image location. In an example, the locational information may comprise a geotag. The geotag may be evaluated to determine the image location (e.g., GPS coordinates, a street address, etc.) where the image was captured. The geotag may be generated automatically via GPS/Wi-Fi or manually by the user. In an example, the geotag may be contained within metadata of the image.

In an example, a home location of the user may be determined based upon one or more additional images associated with the user (e.g., images previously uploaded to a social networking website may be evaluated to determine the home location for the user). The home location of the user may comprise a residence of the user, a work place, a frequently visited location, a town or city of the user, a school of the user, and/or an event location where an event or activity primarily takes place (e.g., the home location for a user associated with a baseball class may comprise a baseball stadium where the user primarily plays baseball games). The home location may comprise a geographical radius surrounding a particular location (e.g., the home location may comprise an area encompassing a two-mile radius around the user's house). It may be appreciated that locational information, such as GPS coordinates of a smart phone or vehicle navigation unit, and/or other user information (e.g., a social network profile indicating a place of work of the user) may be used to identify the home location.

In an example, locational information for the additional images associated with the user may be evaluated utilizing a leader-follower algorithm to determine the home location (e.g., the leader-follower algorithm may evaluate locational groupings of the additional images over a set period of time). For example, an image repository (e.g., images uploaded to an image sharing webpage, a personal database of images, etc.) associated with the user may be evaluated to identify a set of images comprising locational information. One or more images within the set of images may be grouped into a first cluster based upon the one or more images corresponding to a first location (e.g., images taken at the baseball stadium associated with the user's baseball team may be grouped into a first cluster). In an example, a cluster radius for the first cluster may be determined. In an example, the cluster radius may be set by the user in order to shorten the runtime for the leader-follower algorithm and/or increase the likelihood of identifying a home location for a class (e.g., expand the cluster radius to include more images from the set of images within the first cluster). In an example, images within the set of images associated with a second location may be grouped into a second cluster.

A total number of images in the first cluster and/or a timespan for the images in the first cluster may be determined. In an example, timestamps of the images within the first cluster may be evaluated to determine the timespan for the first cluster. Responsive to the total number of images (e.g., image count) in the first cluster exceeding an image count threshold and the timespan for the first cluster exceeding a timespan threshold, determining that the first location corresponds to the home location of the user (e.g., a frequently visited location by the user such as home or work). In an example, the timespan threshold for the home location may be 30 days or more. Responsive to the timespan for a first cluster associated with a first location being 12 days (e.g., the length of a vacation), the first location may not be determined to be the home location for the user. In another example, responsive to the timespan for a second cluster of images, from the set of images, associated with a second location being 450 days, the second location may be determined to be the home location for the user.

At 410, responsive to the image location corresponding to the home location of the user, the predicted class may be determined to be a class associated with the user. In an example, the home location may be utilized to confirm that the life event and/or life stage illustrated by the image is associated with the user. For example, responsive to the image location not corresponding to the home location of the user, the predicted class may not be determined to be a class associated with the user. In this way, images corresponding to life events and/or life stages for a second user may not be utilized to improperly determine a class for the user. By way of example, the user may travel to a graduation event for a child (e.g., the second user) and generate a graduation image of the graduation event. The graduation image may be evaluated to identify a graduation predicted class. However, responsive to the graduation event not corresponding to the home location for the user, the graduation predicted class and the graduation event may be determined to not be associated with the user (e.g., the parent). Thus, the likelihood of improperly determining classes for the user from images taken by the user may be reduced.

In an example, a confidence score may be determined for the predicted class. The confidence score may correspond to a match score associated with the identification of the image feature and/or the object. The match score may be a function of a comparison of the features and/or objects within the image to a set of known features and/or known objects (e.g., the confidence score for the predicted class may be computed by taking a dot product between weights associated with various layers and pixel data for the image). In an example, responsive to the match score exceeding a threshold amount, increasing the confidence score for the predicted class. In another example, a tag associated with the image may be evaluated to determine a context for the image. Responsive to the context corresponding to the predicted class for the user, the confidence score for the predicted class may be increased. In yet another example, an individual within the image may be evaluated utilizing a facial recognition technique to determine an identity of the individual. Responsive to the identity of the individual corresponding to the user, the confidence score for the predicted class may be increased (e.g., if the user is depicted in an image of a life event, the likelihood/confidence level that the life event is associated with the user, and not a second user, may be increased). Responsive to the confidence score exceeding a confidence threshold, the predicted class may be identified as the class.

At 412, content (e.g., text, images, audio, video, etc.) from a content repository may be selected based upon the class associated with the user. In an example, the content may comprise promotional content (e.g., an image of a car seat, a video clip for plumbing services, an interactive graphic for a store offering a special on diapers, etc.). The promotional content may recommend a product and/or a service associated with the class (e.g., a video for a honeymoon resort may be selected in response to the class being a newlywed class). In an example, the class may be utilized to query the content repository to identify the content. The content may be linked (e.g., indexed) to the class and/or characteristics associated with the class. The characteristics may comprise a demographic characteristic (e.g., age, location, income, relationship status, gender, occupation, education, etc.) and/or a purchasing characteristic (e.g., goods and/or services typically purchased by individuals within the class, such as household goods, electronic goods, insurance products, pediatricians services, etc.). In an example, content items, within the content repository, may be indexed by the life event and/or the life stage associated with the class. For example, a home insurance promotional content item may be indexed as being associated with a new home purchase life event. Responsive to the class being a new homeowner class, the home insurance promotional content item may be selected based upon the link between the home insurance promotional content item and the new home purchase life event (e.g., because the user purchased a new home, the user may be interested in home insurance content items).

At 414, the content may be provided to the user. In an example, a content server associated with the content repository may be configured to provide the content via a network to a user device of the user (e.g., a personal computer, a smartphone, a smartwatch, smart glasses, etc.). For example, the content may be provided to the user through an email, a social network post, a mobile alert, a promotional content display area of a webpage (e.g., an area for displaying promotional content, such as a banner at the top of a webpage), a popup notification, and/or the like.

In an example, a plurality of classes may be identified based upon a plurality of images associated with the user. The plurality of classes may be stored in a user profile for the user. Content may be provided to the user based upon the user profile. In an example, a particular class may remain in the user profile for a specified time period (e.g., a month, a year, etc.). The specified time period may be determined based upon the life event and/or the life stage associated with the class. For example, a newlywed class corresponding to a marriage life event may remain in the user profile for six months and/or a pet owner class corresponding to the user getting a puppy may remain in the user profile for ten years. In this way, content relevant to the user may be provided to the user for a time period associated with the life event and/or life stage.

In another example, user interest data, such as click through data (e.g., data indicating content items that the user interacted with and/or was interested in learning more about), may be utilized to determine the specified time period. For example, responsive to the click through data for a first content item associated with a first class being indicative of a low user interest in the first content item, a first specified time period may be reduced to generate a reduced time period (e.g., if the user has not clicked on a plurality of content items associated with the first class in several weeks, the period of time before the class is removed from the user profile may be shortened and/or terminated immediately). In another example, responsive to the click through data for a second content item associated with a second class being indicative of a high user interest in the second content item, the specified time period may be extended to generate an extended time period. In yet another example, responsive to subsequently receiving (e.g., the user uploading) additional images correspond to the particular class, the specified time period may be extended.

In an example, training data may be utilized to train the image classifier. The training data may comprise a set of training images containing one or more known objects and/or features (e.g., birds, babies, cars, edge details, coloration, etc.). In an example, multiple-graphical processing units (GPUs) may be utilized to train the image classifier (e.g., train an algorithm). For example, the set of training images may be utilized to parallelize the training of the image classifier across the multiple GPUs. In this way, the convergence and/or training of the algorithm may be sped up. In an example, the image classifier may be trained by a back-propagation method and/or a stochastic gradient descent method. The training may comprise identifying network weights to determine a minimum error between the predicted class and the class. In an example, the minimum error may be reduced during the training until a constant is identified from the minimum error (e.g., the minimum error may become a constant once the minimum error cannot be further reduced). The constant may be utilized as a threshold to determine when the algorithm can stop (e.g., determine when the algorithm is trained and/or when an object, a feature, and/or a class has been identified).

In an example, the set of training images may be augmented (e.g., a filter may be applied to the training images). The augmenting the training images may comprise shifting, rotating, mirroring, and/or distorting (e.g., light changes, sharpness changes, etc.) the training images. In this way, the training images may be varied to provide a more diverse set of training images, which may increase the efficiency (e.g., speed, accuracy, etc.) with which the image classifier may identify image features, objects and, or classes. At 416, the method 400 ends.

Figure 5A:
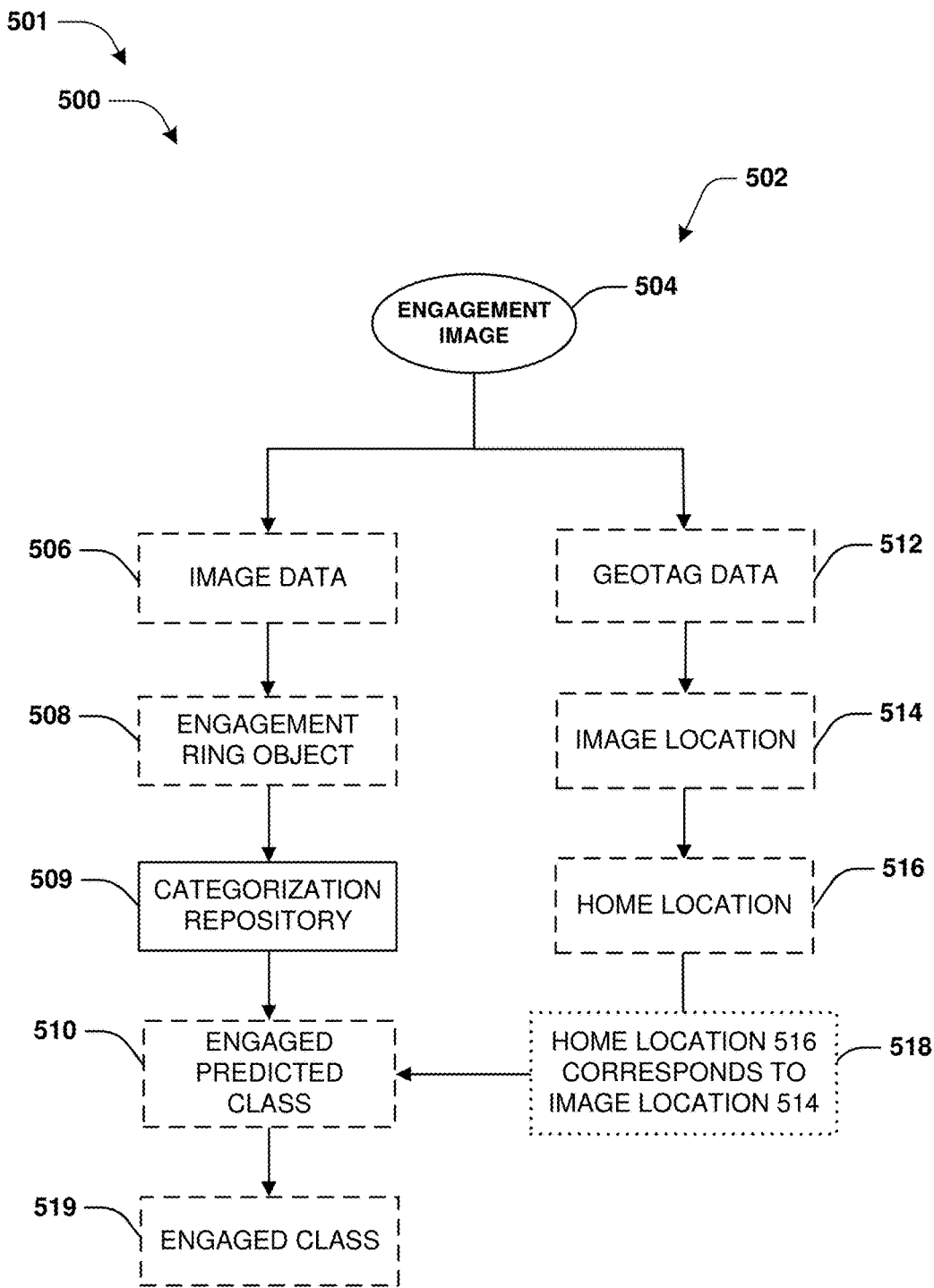
FIG. 5A is a component block diagram illustrating an example system for providing content to a user, wherein an image classifier component is configured to provide wedding venue promotional content to the user based upon an engagement image associated with the user.
Figure 5B:
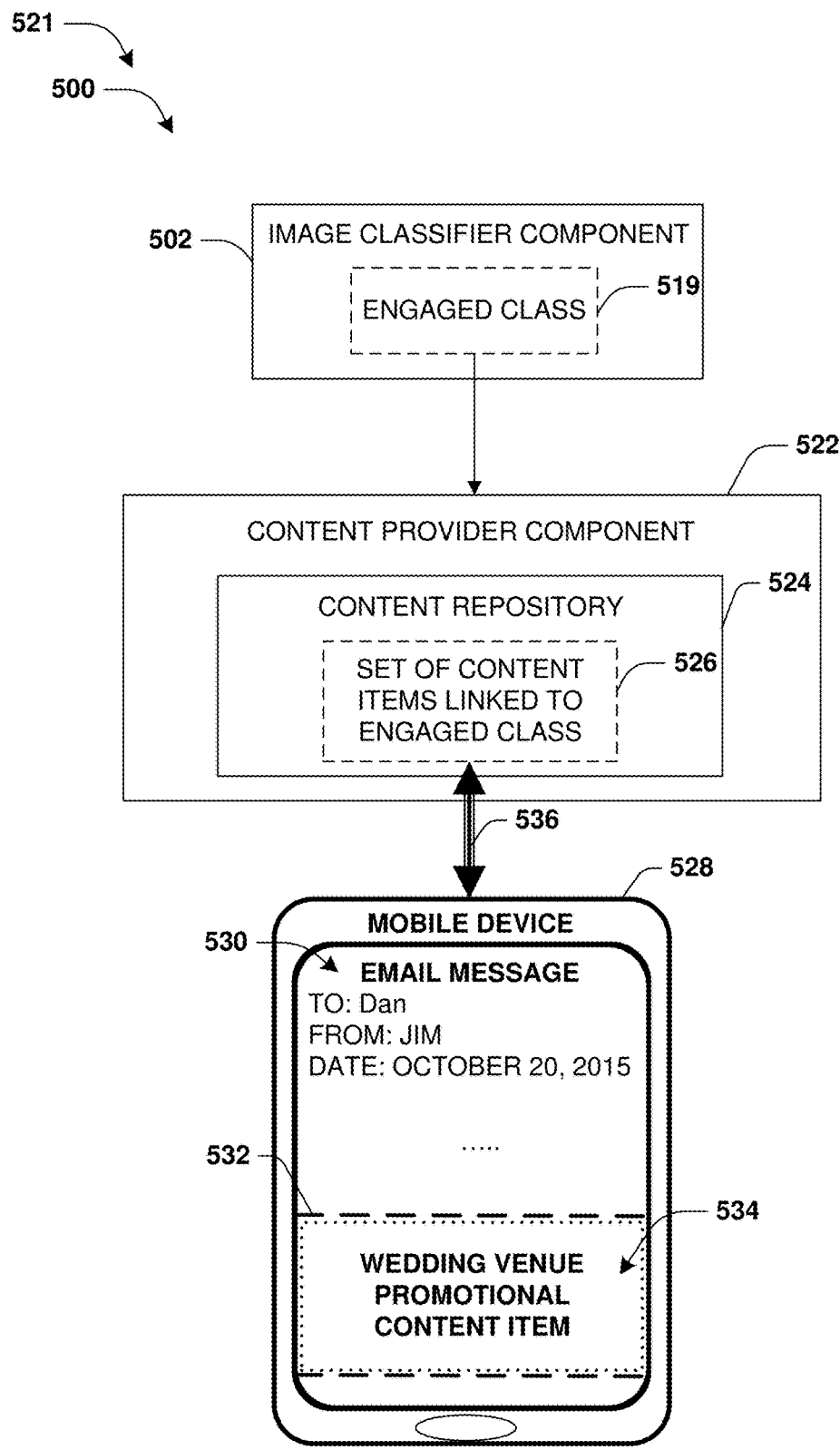
FIG. 5B is a component block diagram illustrating an example system for providing content to a user, wherein a content provider component is configured to provide wedding venue promotional content to a mobile device of the user.

FIGS. 5A-5B illustrate examples of a system 500 for providing content to a user, wherein an image classifier component 502 may be configured to provide a wedding venue promotional content item 534 to the user (not illustrated) based upon an engagement image 504. FIG. 5A illustrates an example 501, wherein the image classifier component 502 is configured to determine that an engaged class 519 is associated with the user based upon the engagement image 504. The image classifier component 502 may be configured to evaluate the engagement image 504 to identifying image data 506. The image classifier component 502 may evaluate the image data 506 to identify an engagement ring object 508 within the engagement image 504. Responsive to identifying the engagement ring object 508, the image classifier component 502 may be configured to assess a categorization repository 509 to identify an engaged predicted class 510 based upon the engagement ring object 508 within the engagement image 504. In an example, a plurality of objects may be identified from the engagement image 504 and subsequently utilized to determine the engaged predicted class 510.

In an example, the image classifier component 502 may be configured to evaluate geotag data 512 of the engagement image 504 to determine an image location 514. The image location 514 may be compared to a home location for the user. Responsive to the image location 514 corresponding to the home location for the user, the engaged predicted class 510 may be determined to be the engaged class 519 associated with the user.

FIG. 5B illustrates an example 521 of the system 500, wherein a content provider component 522 may be configured to provide the wedding venue promotional content item 534 to a mobile device 528 of the user. In an example, responsive to determining the engaged class 519 for the user, the image classifier component 502 may provide the engaged class 519 to the content provider component 522. The content provider component 522 may be configured to utilize the engaged class 519 and/or class characteristics associated therewith to assess a content repository 524. The content provider component 522 may identify a set of content items 526 linked (e.g., by an index, tags, etc.) to the engaged class 519. Responsive to identifying the set of content items 526 from the content repository 524, the content provider component 522 may be configured to provide the wedding venue promotional content item 534 from within the set of content items 526 to the mobile device 528 of the user. In an example, the wedding venue promotional content item 534 may be transmitted over a wide area network (illustrated by arrow 536) as part of an email message 530. The wedding venue promotional content item 534 may be configured to be displayed in a promotional content display area 532 of the email message 530.

Figure 6:
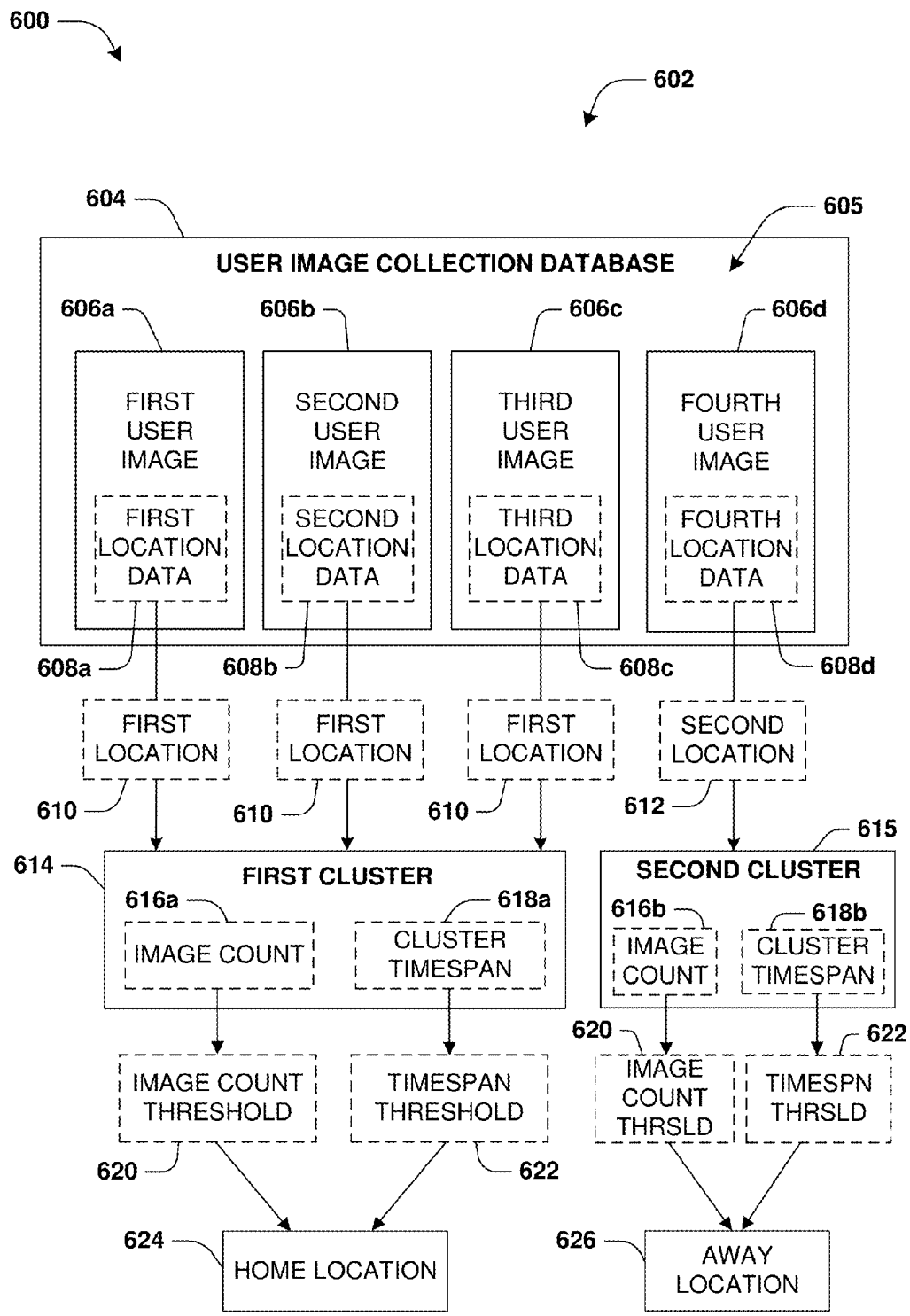
FIG. 6 is a component block diagram illustrating an example system for providing content to a user, wherein an image classifier component is configured to determine a home location for the user.

FIG. 6 illustrates an example of a system 600 for providing content to a user, wherein an image classifier component 602 is configured to determine a home location 624 for the user. The image classifier component 602 may be configured to assess a user image collection database 604 to identify a set of user images 605, such as a first user image 606a, a second user image 606b, a third user image 606c, and a third user image 606d. The user images 606a-606d within the set of user images 605 may comprise locational data 608a-608d. The image classifier component 602 may evaluate the locational data 608a-608d for the user images 606a-606d to identify locations corresponding to where the user images 606a-606d were captured. For example, the first user image 606a, the second user image 606b, and the third user image 606c may be associated with a first location 610 and the fourth user image 606d may be associated with a second location 612. The user images 606a-606d may be grouped into a first cluster 614 associated with the first location 610 and a second cluster 615 associated with the second location 612. The image classifier component 602 may be configured to evaluate the first cluster 614 and the second cluster 615 to determine image counts 616a-616b and cluster timespans 618a-618b for each cluster. Responsive to the image count 616a for the first cluster 614 exceeding an image count threshold 620 and the cluster timespan 618a for the first cluster 614 exceeding a timespan threshold 622, the image classifier component 602 may determine that the first location 610 corresponds to the home location 624 of the user. In another example, responsive to at least one of the image count 616b for the second cluster 615 not exceeding the image count threshold 620 or the cluster timespan 618b for the second cluster 615 not exceeding the timespan threshold 622, the image classifier component 602 may determine that the second location 612 corresponds to an away location 626 (e.g., the away location 626 may comprise a location that is not associated with a particular life event, activity, and/or life stage for the user). In an example, the image classifier component 602 may utilize the home location to determine whether a predicted class, determined based upon an image, is associated with the user and/or a second user. In this way, the accuracy and efficiency of determining a class for a user based upon an image may be improved.

Figure 7:
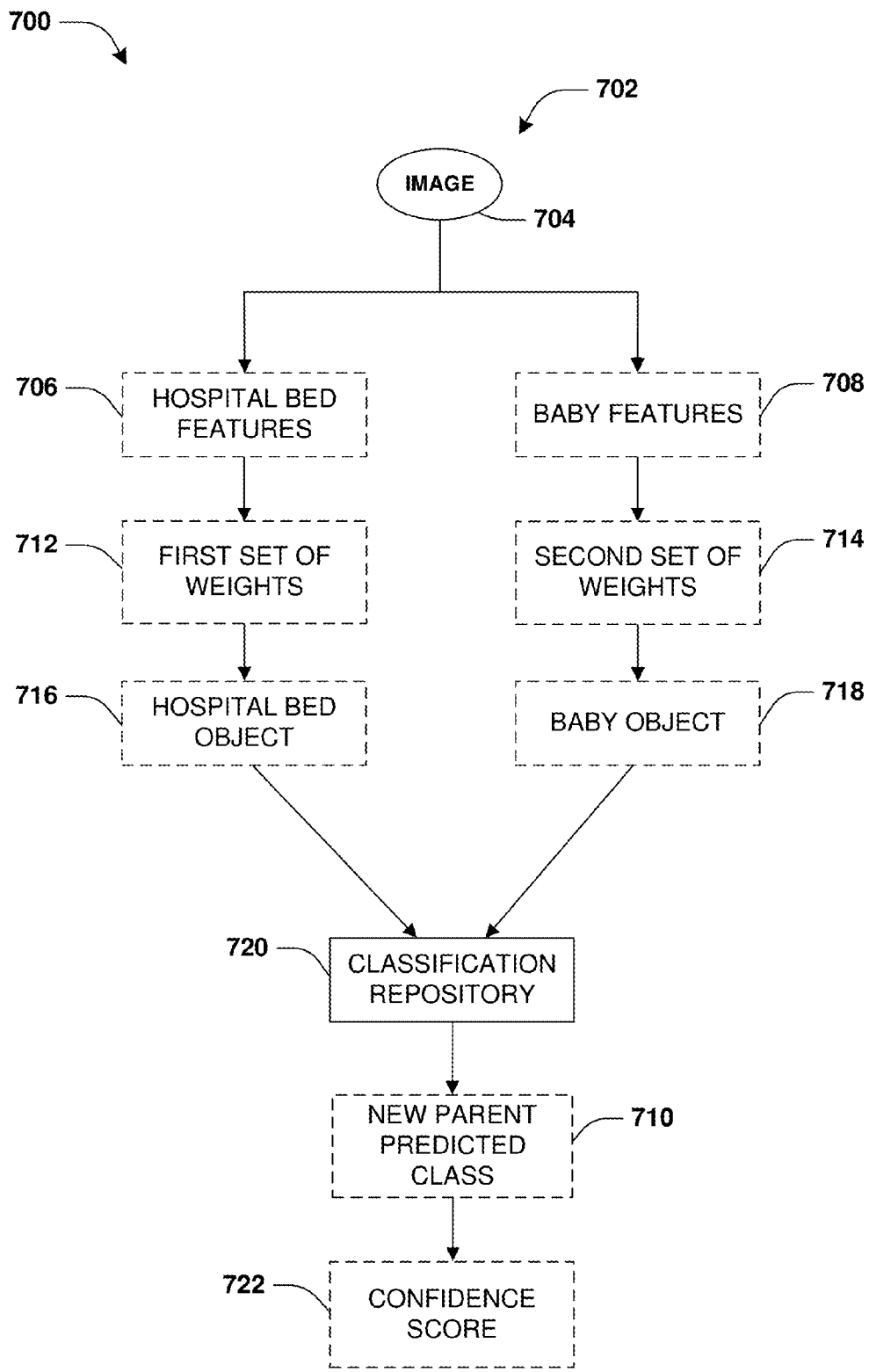
FIG. 7 is a component block diagram illustrating an example system for providing content to a user, wherein an image classifier component is configured to identify a new parent predicted class based upon a hospital bed object and a baby object identified from an image associated with the user.

FIG. 7 illustrates an example of a system 700 for providing content to a user, wherein an image classifier component 702 is configured to identify a new parent predicted class 710 based upon a plurality of objects, such as a hospital bed object 716 and a baby object 718, identified from an image 704. The image classifier component 702 may evaluate the image 704 to identify a plurality of hospital bed features 706 and a plurality of baby features 708. A first set of weights 712 and a second set of weights 714 may be determined for the hospital bed features 706 and the baby features 708. Each of the weights in the sets of weights 712-714 may be determined based upon a contribution of a particular feature towards the identification of a particular object (e.g., bananas are yellow, so the image classifier component 702 may assignee a positive weight to yellow color pixels and a negative weight to red color pixels, edge features distinct to a human face may be assigned a positive weight in association with a baby's face but a negative weight in association with a cat's face, etc.). The hospital bed features 706 and the first set of weights 712 may be evaluated to identify the hospital bed object 716. Similarly, the baby features 708 and the second set of weights 714 may be evaluated to identify the baby object 718. The image classifier component 702 may assess a classification repository 720 utilizing the hospital bed object 716, the baby object 718, and/or the features 706-708 to identify the new parent predicted class 710 as the predicted class for the image 704. The image classifier component 702 may be configured to determine a confidence score 722 for the identification of the new parent predicted class 710 based upon the image 704 (e.g., the confidence score 722 may be determined based upon a dot product between weights associated with various layers and pixel data for the image 704).

Figure 8:
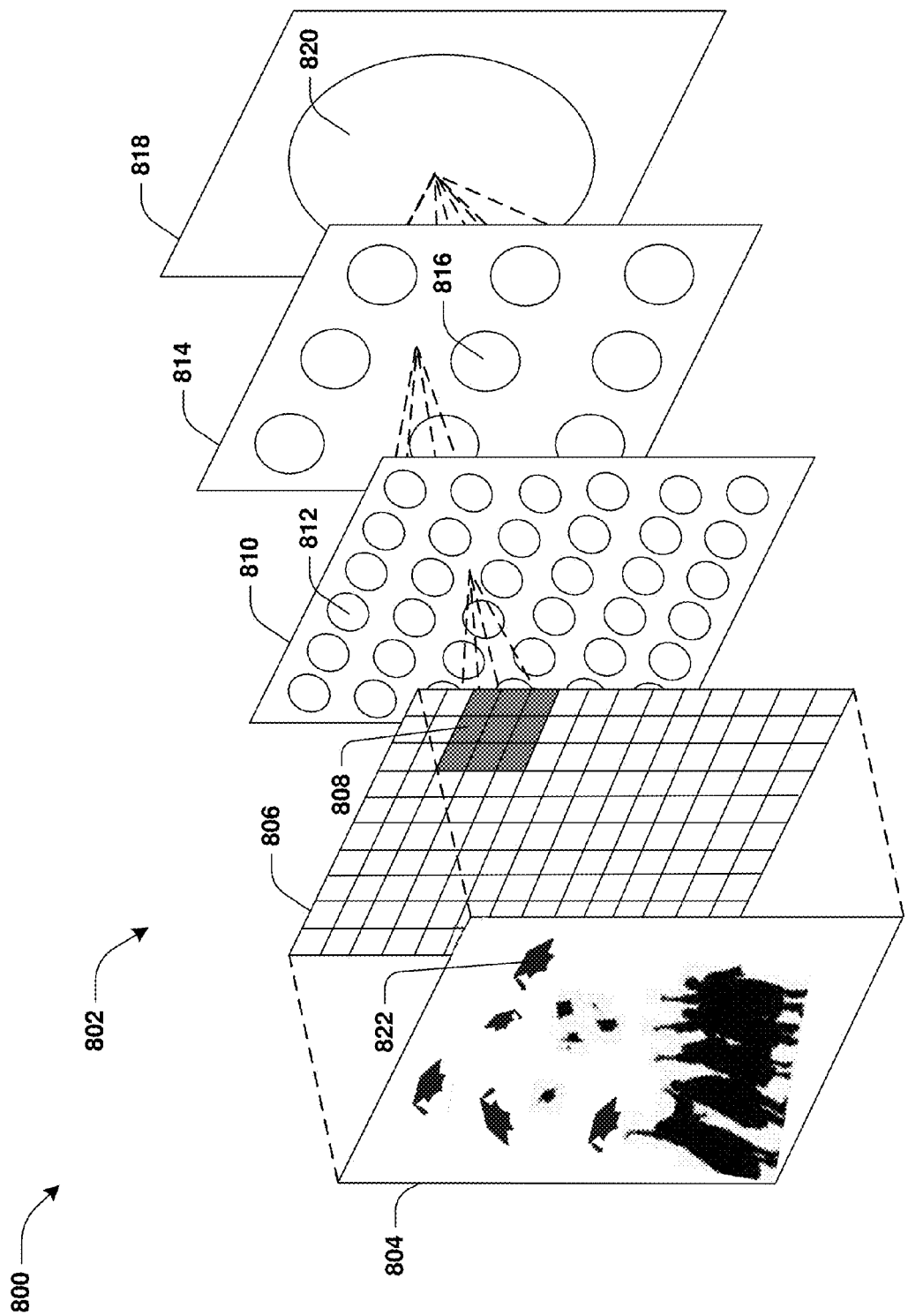
FIG. 8 is a component block diagram illustrating an example system for providing content to a user, wherein an image classifier component is configured to identify a graduation cap object from a graduation image based upon an image feature.

FIG. 8 illustrates an example of a system 800 for providing content to a user, wherein an image classifier component 802 is configured to identify a graduation cap object 822 from a graduation image 804 based upon an image feature 820. In an example, the image classifier component 802 may evaluate the graduation image 804 to generate a feature map 806 comprising pixel attributes 808 corresponding to the graduation image 804. The image classifier component 802 may utilize a first layer 810 to aggregate the pixel attributes 808 into patch level features 812. The image classifier component 802 may utilize a second layer 814 to aggregate the patch level features 812 into aggregated patch level features 816. The image classifier component 802 may utilize a third layer 818 to convert the aggregated patch level features 816 into image level features 820. In an example, a plurality of pixel attributes may be processed to generate a plurality of image level features. The image classifier component 802 may evaluate the image level features 820 to identify the graduation cap object 822 from the graduation image 804. By utilizing the image level features 820 to identify the graduation cap object 822, the image classifier component 802 may increase the accuracy with which objects within images, such as the graduation image 804, are identified.

Figure 9A:
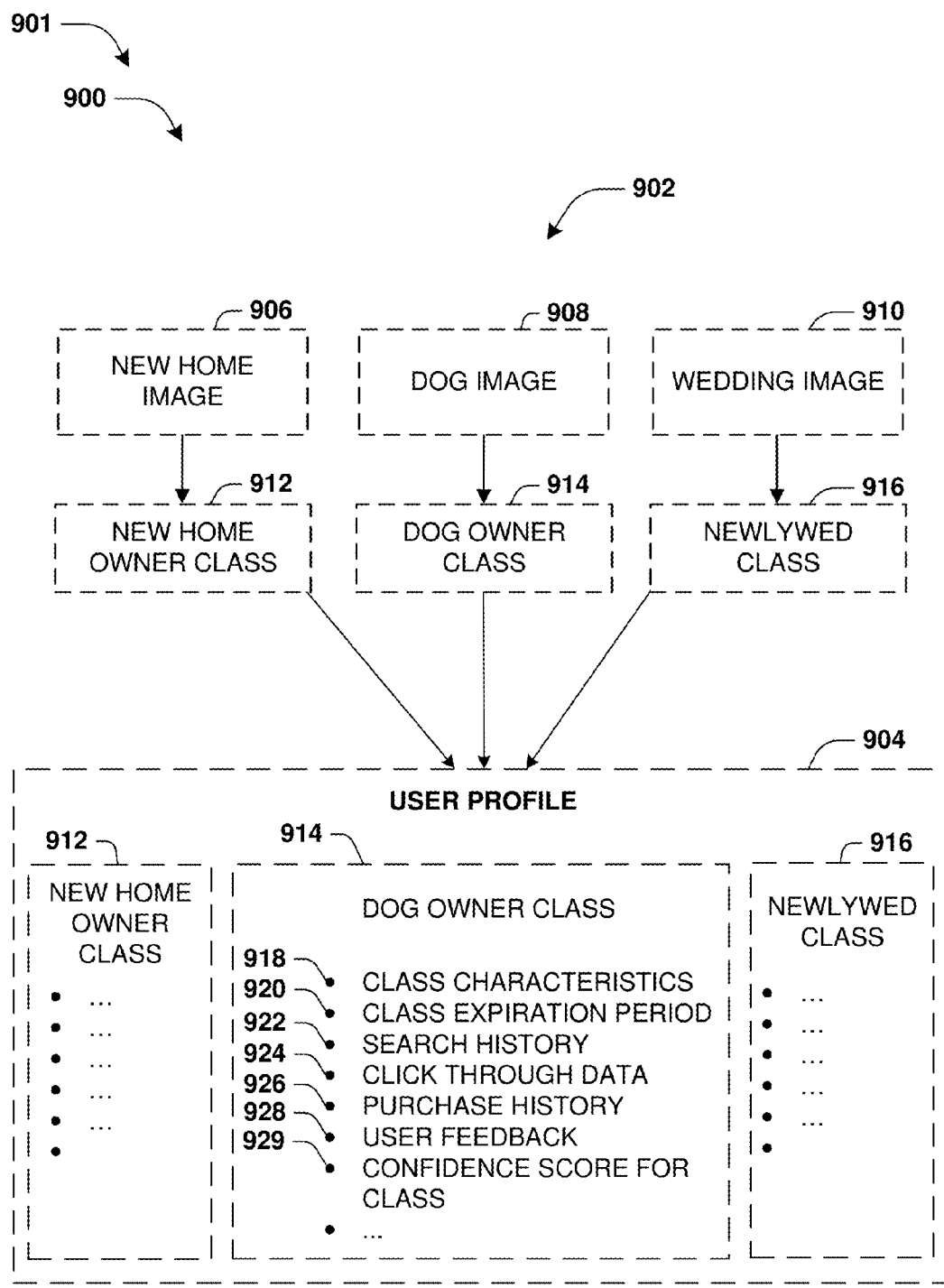
FIG. 9A is a component block diagram illustrating an example system for providing content to a user, wherein an image classifier component is configured to generate a user profile for the user.
Figure 9B:
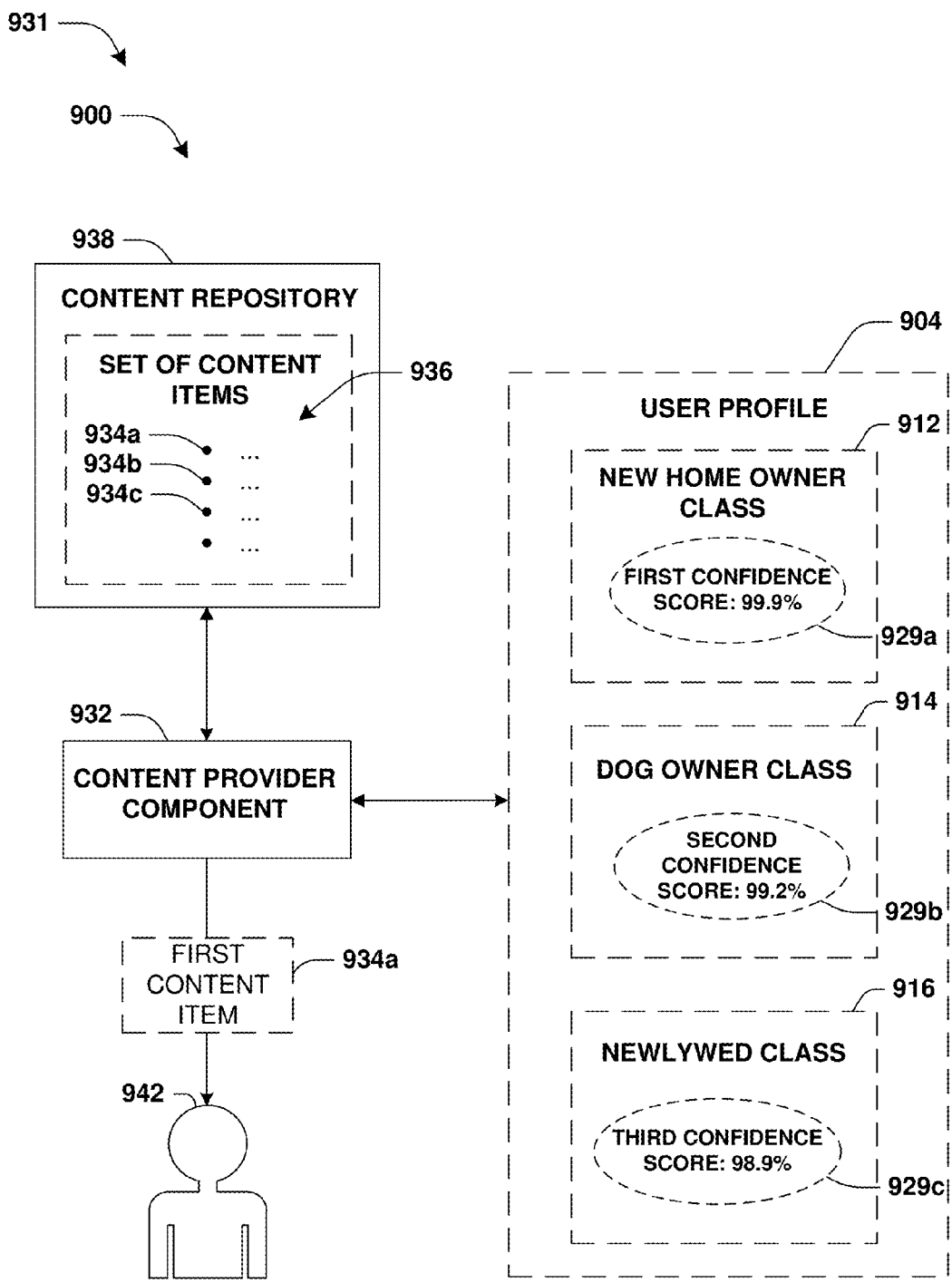
FIG. 9B is a component block diagram illustrating an example system for providing content to a user, wherein a content provider component is configured to utilize a user profile to select content to provide to a user.

FIGS. 9A-9B illustrate examples of a system 900 for providing content to a user, wherein an image classifier component 902 is configured to generate a user profile 904 and a content provider component 932 is configured to utilize the user profile 904 to select content to provide to a user 942. FIG. 9A illustrates an example 901 of generating the user profile 904. As described above with regard to systems 500, 600, and/or 700, the image classifier component 902 may evaluate images, such as a new home image 906, a dog image 908, and a wedding image 910 to determine that the user 942 (illustrated in FIG. 9B) is associated with a new homeowner class 912, a dog owner class 914, and a newlywed class 916. Responsive to determining that the user 942 is associated with the classes 912-916, the user profile 904, comprising the classes 912-916, may be generated. In an example, the user profile 904, comprising the plurality of classes 912-916, may be utilized to identify various content items associated with various classes. In this way, a user experience with the system 900 may be improved as a result of being able to provide relevant content items directed to various areas of interest for the user 942 (illustrated in FIG. 9B).

Responsive to adding the classes 912-916 to the user profile 904, the image classifier component 902 may be configured to determine a class expiration period 920 (e.g., a period of time wherein the class may no longer be relevant to the user 942) and/or class characteristic 918 (e.g., demographic information, purchase histories for other class members, etc.) for each of the classes 912-916. In another example, the image classifier component 902 may model a behavior of the user by tracking user information, such as a search history 922, click through data 924, a purchase history 926, user feedback 928 (e.g., feedback associated with content provided to the user), and/or a confidence score 929 (e.g., the confidence score 929 may correspond to the determination that a particular class is associated with the user based upon a particular image). The user profile 904 may utilize the user information 922-929 to predict a change in a user interest level associated with a particular class (e.g., purchase history data may be evaluated to determine that the user is less interest in a first class and more interest in a second class based upon the user buying a product associated with the second class; user feedback may be evaluated to determine that the user has lost his dog and, as a result, is no longer associated with the dog owners class; etc.). In this way, the user profile 904 may be utilized to identify a variety of relevant content items that correspond to a plurality of classes as well as update the classes associated with the user by determining a current user interest level.

FIG. 9B illustrates an example 931 of the system 900, wherein the content provider component 932 is configured to provide a first content item 934*a* to the user 942 based upon the user profile 904. The content provider component 932 may evaluate the user profile 904 to identify classes 912-916 associated with the user 942. The content provider component 932 may be configured to assess a content repository 938 utilizing the classes 912-916 and/or the class characteristics corresponding thereto to identify a set of content items 936 corresponding to the classes 912-916. Responsive to identifying the set of content items 936, the content provider component 932 may be configured to select the first content item 934*a* associated with the new homeowner class 912 but not a second content item 934*b* associated with the dog owner class 914 from the set of content items 936 based upon a first confidence score 929*a* for the new homeowner class 912 being greater than a second confidence score 929*b* for the dog owner class 914. Responsive to selecting the first content item 934*a*, the content provider component 932 may be configured to provide the first content item 934*a* to the user 942.

Figure 10:
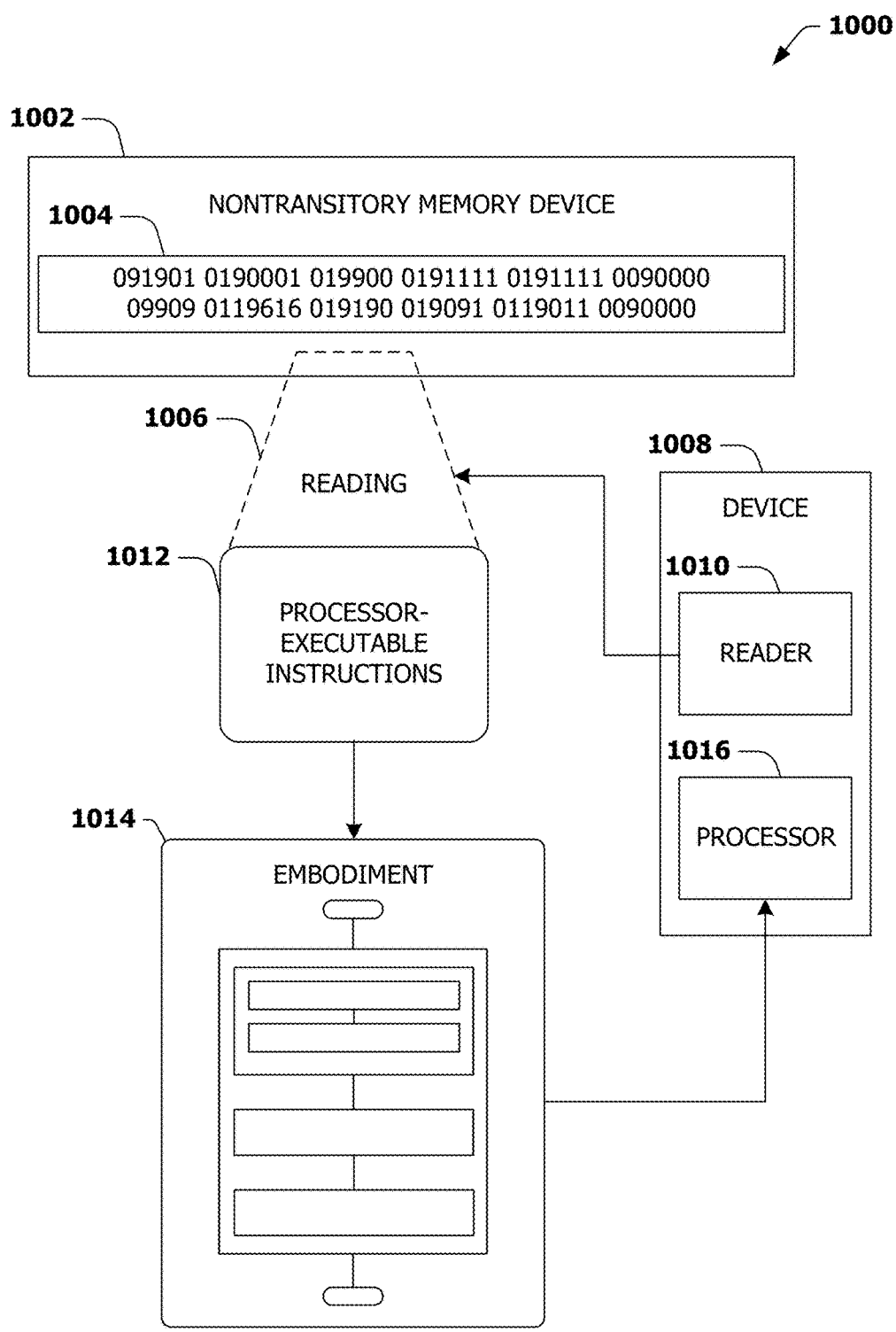
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, for example. In some embodiments, the processor-executable instructions, when executed on the processor 1016 of the device 1008, are configured to implement a system, such as at least some of the example system 500 of FIGS. 5A-5B, at least some of the example system 600 of FIG. 6, at least some of the example system 700 of FIG. 7, at least some of the example system 800 of FIG. 8, and/or at least some of the example system 900 of FIGS. 9A-9B, for example.

3. USAGE OF TERMS

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of providing content to a user, comprising:
evaluating an image, associated with a user, utilizing an image classifier to identify an object within the image;
identifying a predicted class based upon the object;
evaluating locational information for the image to determine an image location;
responsive to the image location corresponding to a home location of the user, determining that the predicted class is a class associated with the user;
selecting content from a content repository based upon the class; and
providing the content to the user.

2. The method of claim 1, comprising:
determining the home location for the user based upon one or more additional images associated with the user.

3. The method of claim 2, the determining the home location of the user comprising:
evaluating an image repository associated with the user to identify a set of images comprising locational information;
grouping one or more images of the set of images into a first cluster based upon the one or more images corresponding to a first location;
determining a total number of images in the first cluster;
determining a timespan for the images in the first cluster; and
responsive to the total number of images in the first cluster exceeding an image count threshold and the timespan for the first cluster exceeding a timespan threshold, determining that the first location corresponds to the home location of the user.

4. The method of claim 1, comprising:
determining a confidence score for the predicted class; and
the identifying the predicted class as a class associated with the user comprising identifying the predicted class as the class based upon the confidence score exceeding a confidence threshold.

5. The method of claim 4, the determining a confidence score comprising:
comparing the object utilized to identify the predicted class to a set of known objects to determine a match score for the object; and
responsive to the match score exceeding a threshold amount, increasing the confidence score for the predicted class.

6. The method of claim 4, the determining a confidence score comprising:
evaluating an individual within the image utilizing a facial recognition technique to determine an identity of the individual; and
responsive to the identity of the individual corresponding to the user, increasing the confidence score for the predicted class.

7. The method of claim 1, the class comprising at least one of:
an athletic class, a college class, a school class, a graduate class, an engagement class, a wedding class, a parent class, a new homeowner class, a career class, a hobby class, or a pet owner class.

8. The method of claim 1, the image classifier comprising a non-linear classifier utilizing a convolutional neural network configured to transform image elements.

9. The method of claim 8, comprising:
configuring the image classifier to transform image elements through a series of layers, wherein each layer extracts features from an output of a previous layer.

10. The method of claim 9, the series of layers comprising:
at least one of a pooling layer, a rectified linear unit layer, a convolutional layer, or fully connected layer.

11. The method of claim 1, comprising:
receiving feedback associated with the identification of at least one of the predicted class or the object from the user; and
training the image classifier based upon the user feedback.

12. The method of claim 1, comprising:
receiving feedback associated with the identification of at least one of the predicted class or the object from the user; and
responsive to the feedback indicating an improper identification for at least one of the predicted class or the image feature, prompting the user to provide a proper identification of at least one of the predicted class or the image feature.

13. The method of claim 1, the evaluating an image, associated with a user, utilizing an image classifier to identify an object comprising:
aggregating pixel attributes of the image into patch-level features;
evaluating the patch-level features to determine aggregated patch-level features;
evaluating the aggregated patch-level features to identify one or more image features for the image; and
evaluating the one or more image features to identify the object.

14. The method of claim 2, comprising:
evaluating locational information for the one or more additional images utilizing a leader-follower algorithm to determine the home location based upon a locational grouping of the one or more additional images over a set time span.

15. The method of claim 1, the evaluating an image comprising:
obtaining the image from at least one of a social media community, a microblogging community, a workgroup community, an online forum community, or an image sharing community.

16. A system for providing content to a user, comprising:
an image classifier component configured to:
evaluate an image, associated with a user, to identify an object within the image;
identify a predicted class for the user based upon the object;

evaluate locational information of the image to determine an image location for the image;

determine a home location of the user by utilizing a leader-follower algorithm to evaluate one or more additional images associated with the user; and responsive to the image location corresponding to the home location, determine that the predicted class is a class associated with the user; and a content provider component configured to:

select content from a content repository based upon the class associated with the user; and provide the content to the user.

17. The system of claim 16, the image classifier component configured to:

evaluate an image repository associated with the user to identify a set of images comprising locational information;

group one or more images of the set of images into a first cluster based upon the one or more images corresponding to a first location;

determine a total number of images in the first cluster;

determine a timespan for the images in the first cluster; and responsive to the total number of images in the first cluster exceeding an image count threshold and the timespan for the first cluster exceeding a timespan threshold, determine that the first location corresponds to the home location of the user.

18. The system of claim 16, the image classifier component configured to:

determine a confidence score for the predicted class; and identify the predicted class as the class based upon the confidence score exceeding a confidence threshold.

19. The system of claim 16, comprising:

a training component configured to:

train an untrained image classifier using a training image database to create the image classifier.

20. A non-transitory computer readable medium comprising computer executable instructions that when executed by a processor perform a method for providing content to a user, comprising:

evaluating an image, associated with a user, utilizing an image classifier to identify an image feature within the image;

identifying a predicted class for the user based upon the image feature;

evaluating locational information of the image to determine an image location for the image;

determining a home location of the user based upon one or more additional images associated with the user, the determining the home location comprising:

evaluating locational information for the one or more additional images utilizing a leader-follower algorithm to determine the home location based upon a locational grouping of the one or more additional images over a timespan;

responsive to the image location corresponding to a home location of the user, determining that the predicted class is a class associated with the user;

selecting promotional content from a content repository based upon the class; and providing the promotional content to the user.

* * * * *